Figure 1:
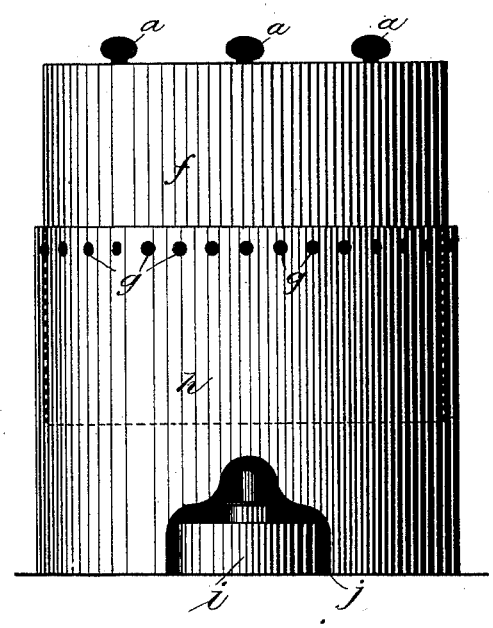

(No Model.)

W. H. SIMONDS.
APPARATUS FOR COOKING EGGS.

No. 461,989. Patented Oct. 27, 1891.

WITNESSES:

INVENTOR,
William H. Simonds,
by Willard Edely, Attorney.

UNITED STATES PATENT OFFICE.

WILLIAM H. SIMONDS, OF EAST WINDSOR, CONNECTICUT.

APPARATUS FOR COOKING EGGS.

SPECIFICATION forming part of Letters Patent No. 461,989, dated October 27, 1891.

Application filed February 18, 1891. Serial No. 381,778. (No model.)

*To all whom it may concern:*

Be it known that I, WILLIAM H. SIMONDS, of East Windsor, (Warehouse Point,) and county of Hartford, Connecticut, have invented a new and improved Process and Apparatus for Cooking Eggs, which process and apparatus are described in the following specification and are illustrated by the accompanying drawings.

My invention relates to the art of cooking eggs for eating, and is designed to be used in sick-rooms, at table, and elsewhere. It is matter of common observation that in so-called "soft-boiled eggs" the white or albuminous portion is not of uniform consistency in all parts, being thicker near the shell and thinner near the yelk.

It is the object of my invention to impart a superior delicacy to soft-cooked eggs by causing the whites of the same to be cooked to a uniform consistency throughout. To accomplish this object I rotate the egg about its own axis while being cooked.

The best mode in which I have contemplated the practical application of the principles of my invention is shown in the drawings. The apparatus which is there shown may be termed an "egg-boiler," although that term is not applicable in the fullest sense, for the reason that the invention contemplates cooking in hot water either with or without actual ebullition.

Figure 2:
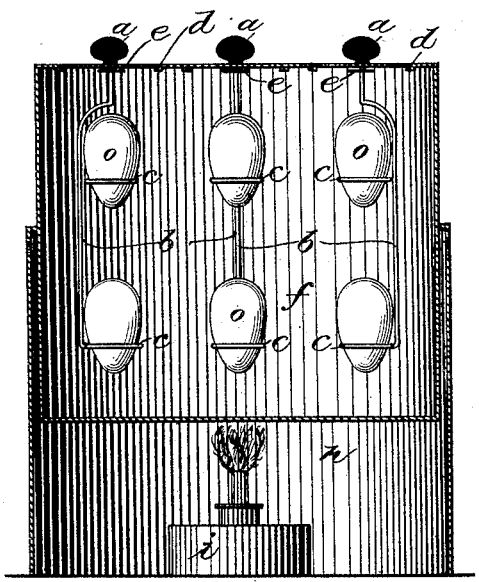
Figure 3:
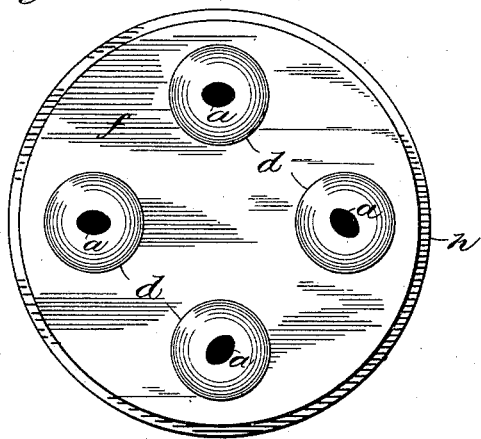

Figure 1 of the drawings is an elevation of an egg-boiler which is constructed in accordance with the requirements of my invention. Fig. 2 is a vertical section of the same in operation. Fig. 3 is a plan of the same.

In the views the letter $f$ denotes the hot-water tank, which is a tin cylinder closed at the bottom and provided at the top with a number of egg-holes, each of which has a lid or cover $d$. In the middle of each lid $d$ is a hole for the wire stem $b$, which is rotatable therein. Stem $b$ is prevented from slipping down through lid $d$ by a finger-piece $a$, and from being drawn up through the same by a collar $e$, as seen in Fig. 2. Stem $b$ is bent so as to have one or more horizontal loops $c$, suitable each to hold one egg $o$, set therein directly under lid $d$, as shown. The lower part of tank $f$ is surrounded by a jacket $h$. This jacket is a little larger than tank $f$, but is bent over at the upper edge so as to meet the tank and is soldered thereto. Jacket $h$ is also provided with a window $j$ below for the insertion of an alcohol lamp $i$, and with air-holes $g$ above.

The manner of using the invention requires but little description. The tank being filled or nearly filled with water, the lighted lamp being set under the middle of the tank, and an egg being placed in loop $c$, as shown, the cooking of the egg commences. From time to time while the cooking of the egg continues the attendant turns finger-piece $a$, and thereby rotates the egg at intervals about its axis. This operation mixes the unequally cooked parts of the white of the egg together during the time of cooking, cooks the inner and outer parts of the same equally, and produces a uniform degree of coagulation throughout all parts of the white of the egg. When cooked to the taste, the egg or eggs, which are supported by a single stem $b$, are withdrawn from the tank by raising that stem through the hole above by means of the finger-piece $a$. As the latter is raised the lid is lifted from the hole to allow the passage of the egg. As each stem is removable independently of the others, it is obvious that by this mechanism a number of eggs may be cooked unequally or for unequal lengths of time, according to the requirements of differing tastes.

Such being the nature and operation of my invention, I claim as new, and desire to secure by Letters Patent—

1. That improvement in the art of cooking an egg, which consists in rotating the same about its axis while subjected to the action of heat, substantially as and for the purpose specified.

2. The above-described process of cooking an egg, which consists in subjecting the same to the action of heated water and in simultaneously turning the same on its axis, substantially as and for the purpose specified.

3. In an egg-boiler, a hot-water tank, in combination with an independently rotatable stem supported from the cover of the tank by intermediate mechanism, and provided with a loop or holder whereby an egg may be held with its longer axis in the same vertical line which contains the axis of such rotatable stem, substantially as and for the purpose specified.

4. In an egg-boiler, a hot-water tank, in combination with an independently rotatable stem supported from the cover of the tank by intermediate mechanism, and provided with a rotary loop or holder, and a finger-piece, substantially as and for the purpose specified.

In testimony whereof I hereunto set my hand in the presence of two witnesses.

WILLIAM H. SIMONDS.

Witnesses:
 WILLARD EDDY,
 RICHARD H. MATHER.